Dec. 7, 1943.   F. E. TWISS   2,336,377
WINDSHIELD WIPER
Filed April 16, 1941   3 Sheets-Sheet 1

INVENTOR
*Frank E. Twiss.*
BY
*Harness, Dickey & Pierce.*
ATTORNEYS.

Dec. 7, 1943.            F. E. TWISS            2,336,377
                        WINDSHIELD WIPER
                     Filed April 16, 1941            3 Sheets-Sheet 3

INVENTOR
Frank E. Twiss.
BY
Harness, Dickey & Pierce.
ATTORNEYS.

Patented Dec. 7, 1943

2,336,377

UNITED STATES PATENT OFFICE 2,336,377

WINDSHIELD WIPER

Frank E. Twiss, Taunton, Mass.

Application April 16, 1941, Serial No. 388,716

4 Claims. (Cl. 60—62)

This invention relates to windshield wiper mechanism and has for its principal object the provision of a device of the type described whose operation will not be affected or varied due to different operating conditions of the engine of the motor vehicle or the like with which it is associated, which is relatively compact and so arranged as to enable it to be conveniently positioned in any one of a number of desirable locations on a motor vehicle or the like, which is of simple construction and is relatively economical to produce.

Objects of the invention include the provision of a windshield wiper mechanism including a fluid pressure operated wiper motor and electrically driven pumping means for supplying fluid under pressure thereto, the two being connected together into a unitary device applicable to a motor vehicle or the like as such and so constructed and arranged as to be readily mounted in any one of a number of desirable positions in a motor vehicle or the like; the provision of a device of the type described in which the wiper motor is of the oscillating vane type having a wiper shaft connected directly thereto, and the electrically actuated pumping means includes an electrically actuated motor arranged with its shaft extending transversely to the axis of the wiper shaft; the provision of a device of the type described including a plurality of parts arranged in a novel manner; the provision of a device of the type described in which the pumping means includes a reciprocable pumping element arranged for reciprocation in a direction transverse to the axis of the wiper shaft and constantly urged in one direction by spring means, together with electrically operated means for moving the pumping element in opposition to the spring means; the provision of a device as above described in which the electrically operated means comprises a solenoid and armature movable thereby; and the provision of a device of the type described in which the electrically operated means for moving the pumping element in opposition to the spring means comprises a rotatable electric motor having its axis arranged perpendicularly with respect to the axis of the wiper shaft and having an axial cam rotatable therewith and engageable with said pumping element to move it in opposition to said spring means.

Other objects of the invention include the provision of a windshield wiper mechanism comprising fluid pressure actuated means for effecting oscillation of a shaft, reciprocating pumping means for applying fluid pressure to said pressure actuated means, electrically operated means for reciprocating said pumping means and means for varying the stroke of said pumping means; the provision of a construction as above described in which the electrically operated means for driving the pumping means includes a reciprocable armature and cushioning means for limiting movement of the armature in one direction, together with means for varying the effect of said cushioning means; the provision of a construction as above described in which the cushioning means includes a spring buffer and a stop therefor and in which the stop is adjustable in the direction of normal movement of the armature; and the provision of a construction as above described in which remote control means are provided for adjusting the position of the stop.

Further objects of the invention include the provision of a novel make and break mechanism for an electric motor of the reciprocating type; and the provision of a make and break mechanism of the type described including a fixed contact and a movable contact both of which are formed from magnetically attractable material and the latter of which is pivotally mounted on the armature within the magnetic field of the magnet whereby to cause said contacts to remain in engagement with each other during at least a portion of the stroke of said armature under the influence of said magnet, together with means cooperating with said movable contact engageable therewith and utilizing the force of the magnetic attraction between said magnet and armature for breaking the contacts apart to open the circuit for the magnet.

The above being among the objects of the present invention the same consists in certain novel features of construction and combinations of parts to be hereinafter described with reference to the accompanying drawings, and then claimed, having the above and other objects in view.

In the accompanying drawings which illustrate suitable embodiments of the present invention and in which like numerals refer to like parts throughout the several different views.

Fig. 10 is a view similar to Fig. 9 but illustrating the make and break mechanism in a different position;

The present invention involves certain improvements over the construction shown and described in my application for Letters Patent of the United States for Windshield wiper and similar mechanisms filed Sept. 28, 1937, and serially numbered 166,066, now Patent No. 2,245,626, issued Sept. 25, 1940. As compared to such former construction the present invention provides a simplified structure in which various parts are re-arranged to better adapt the device for ready application to motor vehicle in particular. This has been done by so rearranging the parts that when the device is applied to an automobile, for instance, it will occupy a minimum fore and aft space thereby better adapting it to be concealed in the windshield header or under the cowl. Various parts of the device have also been simplified and improved to render the construction more rugged and more economical to produce. This particularly applies to the so-called parking mechanism provided for stopping operation of the mechanism when the windshield wiper blade is in a predetermined position, and to the make and break mechanism for the solenoid motor. In addition, whereas my prior construction was capable of operating with either gaseous or liquid circulating systems, the present invention provides a construction which although also capable of employing either a gaseous or a liquid circulating system is particularly adapted for a gaseous circulating system resulting in certain advantages inherent in such systems. The present invention also provides means for varying the speed of operation of the wiper blade in a simple and effective manner, and also provides for an improved construction of the make and break mechanism for a solenoid type of electric motor.

As in my prior invention, the present invention involves a unit including pressure actuated means preferably of the oscillating vane type for effecting oscillation of a windshield wiper blade and an electrically driven pumping mechanism in circuit with the wiper driving mechansm for effecting a circulation of fluid for operating the wiper driving mechanism. The device thus consists of a unit including pressure operated wiper mechanism and a self-contained means for creating and applying fluid pressure thereto for effecting operation thereof.

Figures 1, 2, 3:
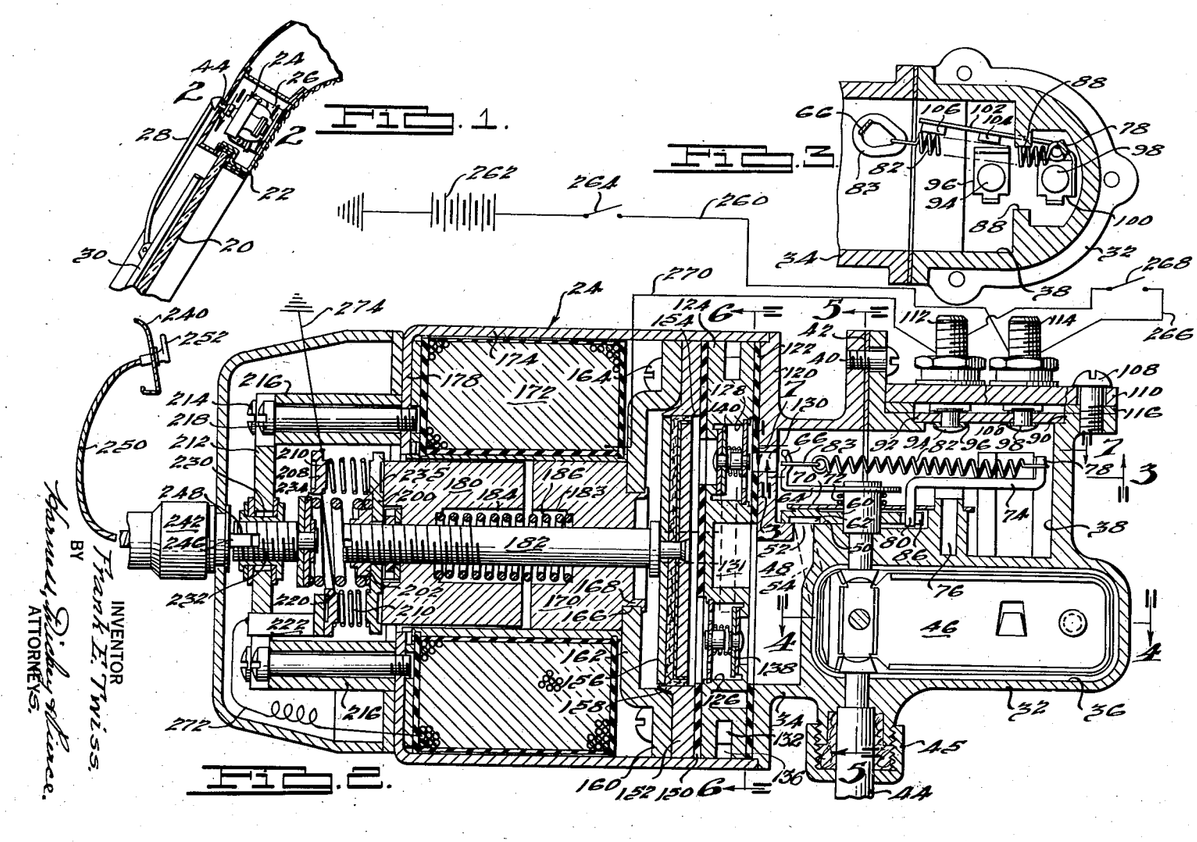
Fig. 1 is a fragmentary, vertical sectional view taken through an automobile windshield and the header thereabove indicating a suitable embodiment of the present invention associated therewith.
Fig. 2 is an enlarged, partially broken sectional view taken centrally through the windshield wiper mechanism shown in Fig. 1 in a plane perpendicular to the plane of the windshield and as on the line 2—2 of Fig. 1.
Fig. 3 is a fragmentary sectional view taken on the line 3—3 of Fig. 2 and illustrating the switch mechanism for the parallel circuit in greater detail.
Figure 4:
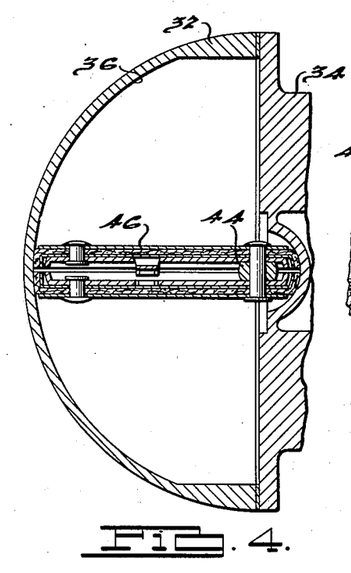
Fig. 4 is a fragmentary sectional view taken on the line 4—4 of Fig. 2 and illustrating the vane chamber and cooperating vane in greater detail.
Figure 5:
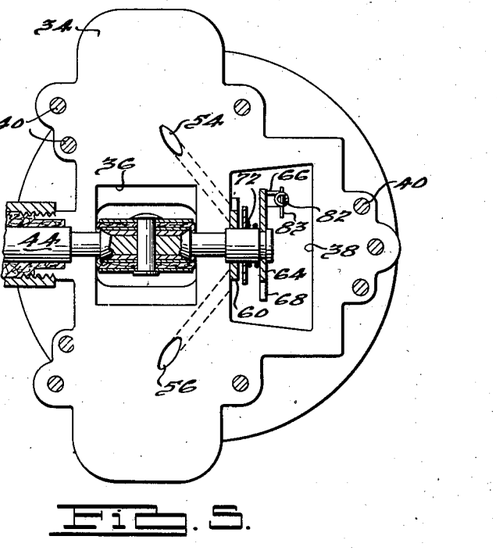
Fig. 5 is a transverse sectional view taken on the line 5—5 of Fig. 2.

Referring now to the accompanying drawings and particularly to Fig. 1 it will be noted that the windshield of a motor vehicle is illustrated at 20 and as being bounded at its upper end by a conventional windshield header 22. Such headers constitute one conventional location for windshield wipers and, accordingly, a windshield wiper indicated generally at 24 and constructed in accordance with the present invention is shown suitably mounted in the header 22 by means of brackets 26. The windshield wiper 24 is provided with a shaft which projects outwardly through the forward wall of the header 22 and is there provided with the usual wiper arm 28 the lower end of which is suitably secured to a conventional wiper blade 30 adapted to be oscillated over the outer face of the windshield 20 for the usual purpose.

Referring now to Figs. 2 to 11, inclusive, and particularly to Fig. 2 it will be seen that the windshield wiper unit 24 there disclosed includes a windshield wiper mechanism proper disposed at the righthand end thereof, an electric motor of the solenoid type at the lefthand end thereof, and pumping apparatus driven by the electric motor positioned between these parts.

The windshield wiper mechanism proper includes a pair of housings 32 and 34 cooperating between them to form an approximately semi-circular vane chamber 36 and a separate valve chamber 38. The two housing portions 32 and 34 have flat matching faces which are secured together by means of screws 40 preferably with the inter-position of a gasket 42 therebetween to effectively seal the two housing parts together. Rotatably mounted on the parting line between the housings 32 and 34 is the wiper shaft 44 to the outer end of which the arm 28 in Fig. 1 is adapted to be secured. The shaft 44 projects through the vane chamber 36 substantially on the axis thereof and projects into the valve chamber 38 as indicated. A packing gland 45 seals the joint between the housings 32 and 34 and the shaft 44 at the point where the shaft projects from these housings. Within the vane chamber 36 the shaft 44 has suitably secured thereto in a conventional manner a conventional vane 46 with the periphery thereof suitably arranged in sealed relation with respect to the walls of the chamber. The vane 46 is, therefore, mounted for oscillation in the vane chamber 36 about the axis of and with the shaft 44.

Figure 7:
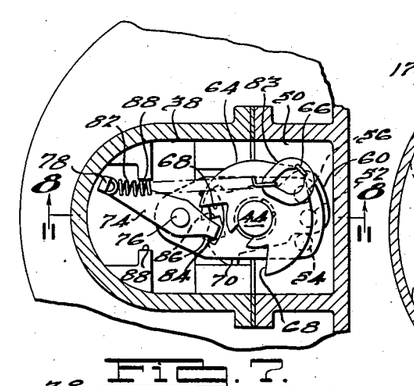
Fig. 7 is a fragmentary sectional view taken on the line 7—7 of Fig. 2 and illustrating the snap valve mechanism in greater detail.
Figure 8:
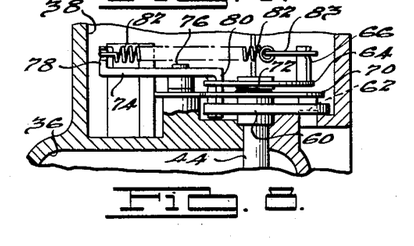
Fig. 8 is a fragmentary sectional view taken on the line 8—8 of Fig. 7.

Means are provided for delivering fluid under pressure into the valve chamber 38 and delivering it therefrom into the vane chamber 36 alternately on opposite sides of the vane 46 in order to effect oscillation thereof, the fluid on the opposite side of the vane 46 being exhausted from the vane chamber 36 into a pocket 48 formed in the lefthand face of the housing 34. In order thus to control the flow of fluid to and from the vane chamber 36 the valve chamber 38 is provided with a flat wall 50 in perpendicular relationship with respect to the shaft 44 on the side of the chamber 38 adjacent the valve chamber 36. This wall has three passages 52, 54 and 56 opening onto it, such passages opening onto the wall 50 on an arc concentric with the shaft 44 and equally angularly spaced with respect to each other as indicated in Fig. 7. The passage 52 opens onto the surface 50 between the two remaining passages. As indicated best in Fig. 2 the passage 52 opens directly into the chamber 48 and, as indicated best in Fig. 5, the passages 54 and 56 open into the circumferentially opposite end portions of the vane chamber 36.

A valve element 60 is rotatably mounted on the shaft 44 in contact with the wall 50 and, as indicated best in Fig. 7, is provided with an end portion which overlies that portion of the wall 50 onto which the passages 52, 54 and 56 open. On its inner face and at the same radial distance from the axis of the shaft 44 that these passages open upon the surface 50 the inner face of the valve element 60 is provided with a recess or pocket 62 of a width capable of bridging the ends of only two of the three passages 52, 54 and 56 at a time, and is so constructed and arranged that when bridging two of such recesses, the third recess is open to the interior of the valve chamber 38. Obviously the exhaust passage 52 is always bridged by the valve 60 and consequently the valve 60 operates to bridge the passage 52 with either of the passages 54 and 56 and to open the remaining passage 54 or 56 to the interior of the valve chamber 38. Thus when fluid under pressure is present in the valve chamber 38 the valve 60 will be in a position to uncover either one of the ports 54 or 56 so as to permit such fluid under pressure to flow through such uncovered port into the vane chamber 36 on one side of the vane 46, the fluid on the opposite side of the vane in the chamber 36 flowing out through the remaining opening 54 or 56 and thence through the recess 62 in the valve 60 to the passageway 52 and through the passageway 52 into the chamber 48.

In order to effect oscillation of the valve 60 in proper relation with respect to the oscillatable position of the vane 46 the following mechanism is provided as best illustrated in Figs. 2, 5, 7 and 8. A disc-like element 64 is fixed to the inner end of the shaft 44 in the chamber 38 for equal rotation therewith. At one point on its periphery the element 64 is provided with an axially extending finger 66 and diametrically opposite the finger 66 it is cut away or notched to provide a pair of angularly spaced approximately radial shoulders 68. A relatively thin leaf spring 70 is anchored at one end in the valve chamber 38 and its opposite end bears against the valve member 60 in that area thereof over the pocket or recess 62, the spring 70 being suitably apertured for the passage of the shaft 44 therethrough. A coil spring 72 surrounds the shaft 44 between the element 64 and the spring 70 and not only supplements the effect of the spring 70 but serves to maintain the associated parts against rattling or the like.

An arm 74 is pivotally mounted within the valve chamber 38 as at 76 in eccentric relation with respect to the shaft 44, and one end of the arm 74 is bent outwardly as at 78 and the opposite end thereof is bent inwardly as at 80. A coil spring 82 is tensioned between the end 78 and a stirrup 83 slidably mounted on the end of the finger 66. The inwardly bent end 80 passes between the shoulders 68 of the element 64, through an arcuate slot 84 in the spring 70 as best shown in Fig. 7, and its free end is engaged in a notch 86 in the valve 60 on the opposite side of the shaft 44 from the recess or pocket 62.

In operation of this valve mechanism the shaft 44 in oscillating with the vane 46 will cause equal oscillation of the element 64 and the finger 66 thereon and will alternately move the line of force of the spring 82 between the fingers 66 and the end 78 of the lever 74 to opposite sides of the pivotal axis of the lever 74, whereupon the lever 74 will be snapped over to the opposite of its movable position as limited by contact of the spring 82 with stop surfaces 88 formed within the valve chamber 38 as best shown in Fig. 7. The lever 74 in thus being alternately snapped between opposite limits of movement will act through its end 80 to alternately shift the valve member 60 from a position bridging the passage 52 with one of the passages 54 and 56 to a position bridging the opening 52 with the other of the passages 54 and 56, thus to effect a reversal of the application of pressure to the opposite faces of the vane 46. The shoulders 68 on the element 64 serve to cooperate with the end 80 of the lever 74 to initiate the oscillatory movement of the lever 74 under the force of spring 82 in event delay in movement of the lever 74 under the force of the spring 82 occurs for any reason whatever.

As best illustrated in Figs. 2 and 3 the valve chamber 38 is provided with an opening 90 in a side wall thereof which is shouldered for reception of a block 92 of insulating material. On its inner face the block 92 has secured thereto by means of a rivet 94 an angle contact element 96. It also has secured to the inner face thereof by means of a rivet 98 a bracket 100 to which is secured one end of a spring arm 102 which extends past the contact element 96 as illustarated in Fig. 3 and in line therewith is provided with a contact 104. At its free end the arm 102 is provided with a contact pad or wear plate 106 of insulation material arranged in intersecting relation with respect to the path of movement of the spring 82 adjacent one end of the limit of movement of the spring 82 in one direction. Normally the spring arm 102 urges its contact 104 into engagement with the contact element 96 thereby to complete a circuit between them. However, each time the spring 82 approaches the one limit of its shiftable position during operation of the valve mechanism above described, it will contact the plate 106 and move the arm 102 to separate the contact 104 from the contact element 96.

Secured to the outer face of the housing portion 32 over the opening 90 by means of screws 108 is a block 110 of insulating material on which is supported a pair of binding posts 112 and 114, respectively. The binding post 112 is suitably electrically connected to the rivet 94 and thence to the contact element 96 and the binding post 114 is electrically connected to the rivet 98 and through it to the contact 104. The plate 110 is, of course, suitably sealed in fluid-tight relationship with respect to the housing 32 over the opening 90 and this is preferably accomplished through the use of a suitable gasket 116. This switch mechanism including the contact elements 96 and 104 constitutes a switch for use in a parallel circuit for the electric motor as will hereinafter be more fully described.

Figure 6:
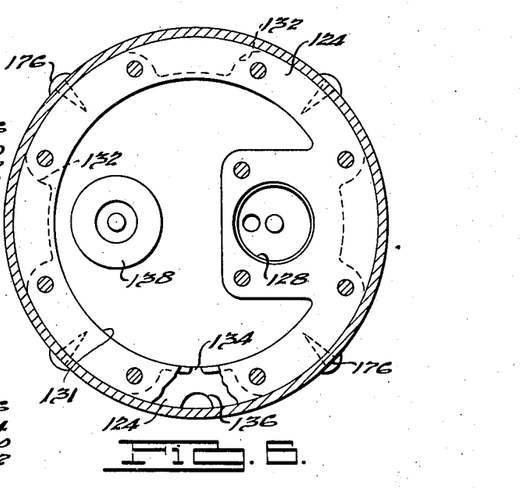
Fig. 6 is a partially broken sectional view taken on the line 6—6 of Fig. 2.

The lefthand end of the housing 34 as illustrated in Fig. 2 terminates in a cylindrical flange 120 having a substantially flat outer face. Secured to such face with the inter-position of a suitable gasket such as 122 is a circular valve plate member 124. The valve plate member 124 is provided with a pair of openings 126 and 128, respectively, therethrough, the opening 126 opening into the chamber 48 and the opening 128 into a passage 130 in the housing 34 leading into the valve chamber 38. The righthand face of the plate member 124 inwardly of the margin thereof and around the openings 126 and 128 is hollowed out to form a pocket 131, best shown in Figs. 2 and 6, which is in open communication with the pocket or chamber 48 of the housing member 34. The periphery of the plate member 124 is centrally slotted at angularly spaced points to provide pockets 132 to aid in lightening the structure and one of these pockets, shown as the lower pocket in Fig. 6, is provided with an opening 134 forming an open communication between the same and the pocket 131. This same pocket 132 is provided with a groove 136 in that wall thereof on the side of the housing 32 for a purpose which will hereinafter be described.

A check valve 138 is associated with the opening 126 to limit the flow of fluid therethrough to the left only as viewed in Fig. 2 and the opening 128 is provided with a corresponding check valve 40 permitting flow of fluid therethrough only to the right as viewed in Fig. 2.

Secured to the lefthand face of the port member 124 and sealed thereto by means of a gasket 150 is a cylinder member 152 in the form of a circular disc having a cylindrical bore 154 providing a cylinder in which a piston 156 is adapted to reciprocate. The bore 154 is open to both the openings 126 and 128 in the valve plate member 124. The cylinder member 152 is of substantially equal thickness throughout except immediately surrounding the bore 154 where it is axially elongated as at 158 to increase the effective length of the cylinder bore thereof. The cylinder member 152 is followed by a circular plate-like member 160 provided with an axially offset central portion 162 providing clearance for receiving the lefthand end of the piston 156 when the latter is withdrawn to the left as viewed in Fig. 2 but which is not sufficiently offset to permit complete withdrawal of the piston 156 from the cylinder bore 154. Screws 164 extend through the member 160, cylinder member 152 and valve plate member 124 and thread into the flange 120 of the housing 34 to maintain the assembly of all of these parts and maintain them in fluid-tight relation with respect to each other.

The member 160 is centrally provided with an opening 166 in which is received and secured the reduced end 168 of a core 170 for an annular magnetic coil 172 arranged in concentric relation with respect to the piston 156 and, accordingly, in perpendicular relationship with respect to the axis of the shaft 44. The coil 172 is relatively closely received within a cylindrical housing 174 having an open end which is relatively closely received over the peripheral surfaces of the members 160, 152, 124 and is shouldered upon the periphery of the flange 120 of the housing member 34 and is fixed in position thereon by means of screws 176 as indicated in Fig. 6. The lefthand end of the housing 174 is provided with a radially inturned end wall 178 which terminates in a central opening of greater diameter than the bore of magnet 172 as indicated in Fig. 2.

The core 170 is of a length preferably less than half of the length of the magnet 172 and in the remaining portion of the bore of the magnet is slidably received a cylindrical armature 180. The armature 180 is threadably mounted upon a rod 182 the righthand end of which is fixed to the piston 156 as indicated in Fig. 2. The opposed faces of the core 170 and armature 180 are recessed as at 183 and 184, respectively, in concentric relation with respect to the rod 182 and surrounding the rod 182 in such recesses is a coil spring 186 maintained under constant compression between the opposite ends of such recesses. The spring 186, therefore, constantly urges the armature 180 and, therefore, the piston 156 to the left as viewed in Fig. 2. Energization of the coil 172 acts to magnetically draw the armature 180 towards the core 170 against the force of the spring 186 and, thereafore, moves the piston 156 in the cylinder 154 in opposition to the force of the spring 186.

It will be appreciated that when the piston is moved to the left as viewed in Fig. 2 by the force of the spring 186 it draws fluid from the chamber 48 past the check valve 138 into the cylinder 154, the evacuation of fluid from the chamber 48 acting through the passage 52 and valve pocket 62 to withdraw fluid from that side of the vane 46 in the vane chamber 36 to which the passage 52 is then connected. It will also be appreciated that when the coil 172 is energized to move the piston 156 to the right as viewed in Fig. 2 against the force of the spring 186, the fluid in the cylinder 154 will be discharged therefrom through the opening 128 and past the check valve 140 into the valve chamber 38 and will flow therefrom through either passage 54 or 56 which then happens to be open to the chamber 38, and through such passage to the corresponding side of the vane 46 in the vane chamber 36. As previously explained the application of fluid under pressure in the chamber 36 to either side of the vane 46 will cause oscillation of the vane 46 and shaft 44. The application of pressure to alternately opposite sides of the vane 46 and the alternate escape of fluid from the opposite sides thereof as controlled by means of the valve mechanism above described operates to effect alternately opposite oscillating movements of the vane 46 and shaft 44 as previously described.

In order to effect successive energizations of the coil 172 the following described mechanism is provided in accordance with a further phase of the present invention. In this connection it will be appreciated that in order to obtain the desired travel of the piston 156 the flow of current to the coil 172 must be more than momentary and must be of such prolongation as to permit the desired stroke of the armature 180 and, therefore, the piston 156 to be obtained. In accomplishing this result in accordance with the present invention a cylindrical disc 200 is slipped over the lefthand end of the rod 182 into contact with the lefthand end of the armature 180 as viewed in Fig. 2 and is secured in place thereon by means of a nut 202. The disc 200 is provided at diametrically opposite sides thereof with a pair of spaced arms 204, best shown in Figs. 9 and 10 and projecting to the left as viewed in these figures in parallel relation with respect to the axis of the rod 182. Between the two arms 204 is pivotally mounted between its ends by means of pins 206 a contact arm or lever 208, shown as being of approximately annular formation in the particular case shown. A coil spring 210 is maintained under compression between each end of the arm or lever 208 and the disc or plate 200 and cooperate to constantly urge the arm or lever 208 to a position in approximate parallelism with the plate 200, as illustrated in Fig. 9.

Figure 9:
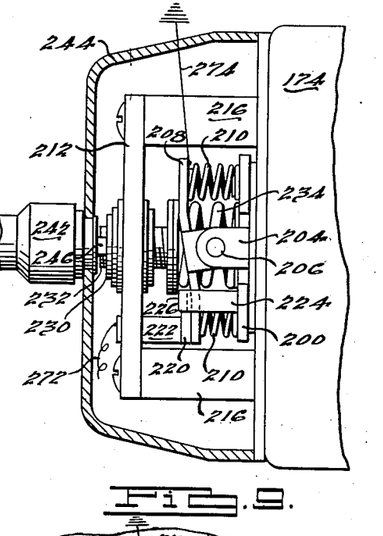
Fig. 9 is a partially broken fragmentary view of the make and break mechanism at the lefthand end of the mechanism as illustrated in Fig. 2 and illustrating the same in its normal inoperative position.
Figures 10, 12:
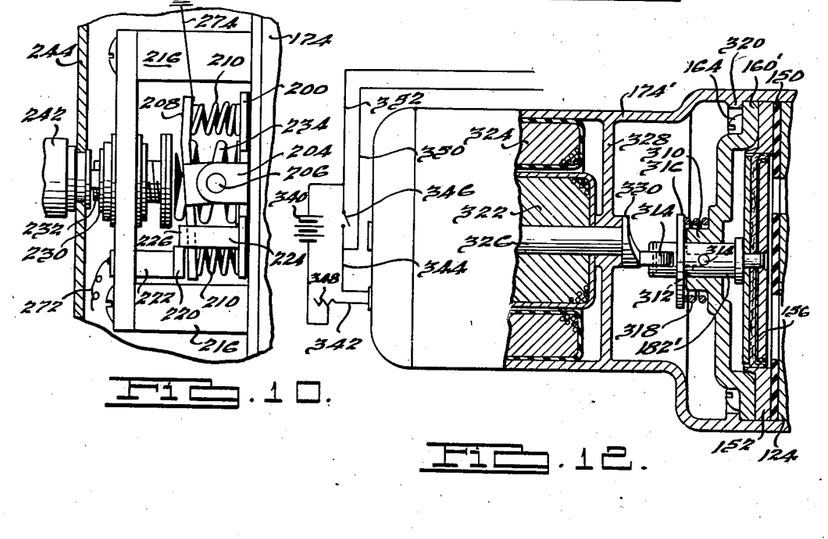

Outwardly or to the left of the arm or lever 208 as viewed in Figs. 2, 9 and 10 is a plate 212 of insulation material secured by screws 214 to posts 216 of insulation material in turn secured by screws 218 to the end wall 178 of the housing 174. Thus the plate 212 is rigidly supported with respect to the housing 174 and associated parts. A contact element 220 is carried by a post 222 fixed with respect to the plate 212 and is located in a position to engage one end of the arm or lever 208 in the manner illustrated in Figs. 2, 9 and 10.

The contact 220 and the arm or lever 208 are both made of magnetically attractable material and particularly the arm or lever 208 is located in the magnetic field of the coil 172 when energized. The electric circuit for the coil 172 includes the arm or lever 208 and the contacts 220 so that when the switch controlling the circuit is closed and the contact 220 is in engagement with the arm or lever 208 the coil 172 is energized and that end of the arm or lever 208 in engagement with the contact 220 is magnetically held thereagainst as the armature 180 moves inwardly or to the right as viewed in Fig. 2.

In order to break the engagement between the arm 208 and the contact 220 after the armature 180 has moved inwardly a desired distance under the magnetic influence of the coil 172, means are provided for overcoming the magnetic drag between the contact 220 and the arm 208 to effect this result. In the construction illustrated in Figs. 2 to 10, inclusive, such means, as illustrated in Figs. 9 and 10, comprises an arm 224 fixed to the plate 200 and provided with a bent-over free end 226 which overlies that end of the arm or lever 208 adjacent to the contact 220. When the armature 180 has moved to the full extent of its movement to the left as viewed in Figs. 2, 9 and 10 under the influence of the spring 186, then the end 226 is positioned in outwardly spaced relation with respect to the adjacent portion of the arm or lever 208. When the coil 172 is energized under such conditions and the armature 180 begins to move inwardly or to the right as viewed in Figs. 2, 9 and 10, that end of the arm or lever 208 engaging the contact 220 is magnetically held thereto whereupon the arm or lever 208 pivots about its pivotal axis against the force of the springs 210 to permit this continued engagement as the armature 180 moves inwardly. However, as the armature 180 moves inwardly the arm 224 and its end 226 also move inwardly at an equal rate of speed with the result that after the armature 180 has moved inwardly a desired amount the end 226 will contact the arm 208 and a very slight movement of the armature 180 thereafter will forcefully break the engagement between the arm 208 and the contact 220, immediately upon which the springs 210 will return the arm 208 to its normal inoperative position as illustrated in Fig. 10 and in which position the end of the arm 208 lies in materially spaced relation with respect to the contact 220. The dis-engagement of the arm 208 and the contact 220 immediately breaks the circuit to the magnet 172 which immediately becomes de-energized with the result that the spring 186 thereupon moves the armature 180 to the left as viewed in Figs. 2, 9 and 10 until engagement is re-established between the arm 208 and the contact 220, whereupon the next cycle of operation is initiated.

Particularly where air or other gas is employed as the fluid medium acted upon by the piston 156 and delivered to the vane chamber 36 for actuating the vane 46, the inertia of the armature 180 and parts movable therewith under the influence of the spring 186 when the coil 172 is de-energized, will carry the armature 180 and the parts carried thereby outwardly or to the left as viewed in Fig. 2 even after the circuit to the coil 172 is re-established by a re-engagement of the arm 208 and contact 220. To limit this effect, as well as for another purpose which will hereinafter be more fully described, the plate 212 has centrally fixed therein in alignment with the rod 182 an internally threaded nut 230 in which is threadably received a stud 232. On its inner end the stud 232 has fixed thereto a head or disc 234 of non-metallic and preferably sound deadening material. A relatively heavy coil spring 235 arranged in concentric relation with respect to the rod 182 is arranged with its inner or righthand end, as viewed in Figs. 2, 9 and 10, in gripping relation with respect to the periphery of the nut 202 on the outer end of the rod 182. The arm of lever 208 is centrally apertured to provide for passage of the spring 235 therethrough and into engagement with the head 234 of the stud 232. The spring 235 is of such axial length that it does not continuously engage the head 234 but when the armature 180 is at or adjacent its inner limit of movement under the influence of the coil 172 its outer end lies in spaced relationship with respect to the head 234 as indicated in Fig. 10. When the circuit to the coil 172 is broken and the armature 180 is projected to the left as viewed in Figs. 2, 9 and 10 under the influence of the spring 186, at or about the time the arm 208 engages the contact 220 the spring 235 will engage the head 234 and act as a resilient buffer for retarding further movement of the armature 180 in response to the inertia built up in it. This bumper mechanism being resilient and devoid of parts having metal-to-metal contact, no appreciable audible sound will result because of its operation.

It will be appreciated that if the stud 232 is screwed outward in the nut 230 so as to withdraw the head 234 outwardly or to the left as viewed in Figs. 2, 9 and 10, then the amount of movement of the armature 180, and consequently the piston 156 to the left under the influence of the inertia built up in the armature 180 during its initial phase of movement in this direction under the force of the spring 186, will carry the armature 180 and consequently the piston 156 further outwardly or to the left in the views described before the buffer mechanism and the pull of the coil 172 stops it. This will have the effect of increasing the stroke of the piston 156 under such conditions and results in the piston 156 delivering a greater volume of fluid upon each stroke. Conversely if the stud 232 is threaded inwardly so as to result in an earlier engagement of the spring 235 with the head 234, then the effective stroke of the piston 156 may be reduced. This feature is employed in connection with the present invention for varying the volume of fluid pumped by the device and consequently controlling the speed of oscillation of the shaft 44 and the windshield wiper blade 30.

The control of the stud 232 may be accomplished in any suitable manner to effect the above described results but in any event it will be appreciated that the control should be such as to be operable from the instrument panel 240 of the associated vehicle or from some other position convenient to the operator of the associated vehicle. The particular means shown in the drawings for accomplishing this result consists of a head 242 centrally secured to a cap 244 provided in protecting relation with respect to the make and break mechanism of the device. The head 242 interiorly contains a rotatable part having an inwardly projecting tongue 246 which is axially slidably received in a diametric slot 248 formed in the outer end of the stud 232. The rotatable member within the head 242 carrying the tongue 246 is connected by a flexible cable 250 to a suitable manually operable operating and indicating device 252 mounted upon the instrument panel 240. Thus by turning the member 252 in one direction or the other the effective stroke of the piston 156 may be either increased or decreased and the speed of oscillation of the shaft 44 and, therefore, the wiper blade 30 thereby increased or decreased as desired.

The binding posts 112 and 114 are the only binding posts required in the electrical circuit for the device. As indicated in Fig. 2 the binding post 114 is connected by a lead 260 to a battery 262 the opposite side of which is grounded as indicated. Preferably the lead 260 includes the usual engine ignition switch 264 so as to insure cutting off the flow of electrical energy to the device when the motor or other vehicle of which it forms a part is stopped thereby to obviate the possibility of running down the battery through continued operation of the windshield wiper when the motor vehicle is left unattended. The binding post 114 is also connected by a lead 266 to the binding post 112 and this lead includes a switch 268 by means of which the normal operation of the windshield wiper mechanism is controlled. The switch 268 is, of course, preferably positioned on the instrument panel of a motor vehicle where the device is used in connection with a motor vehicle or in some other position where it will be available to the operator. The binding post 112 is connected by a lead 270 to one side of the coil 172, the opposite side of the coil being connected by a lead 272 with the post 222 for the contact 220. The contact lever 208 is suitably grounded as more or less diagrammatically indicated by the lead 274.

It will be appreciated that in the absence of additional means, should the switch 268 be opened while the mechanism is operating seldom if ever would the mechanism stop with the windshield wiper blade 30 in a predetermined position. It is, of course, desirable that when any windshield wiper mechanism is shut off the cooperating windshield wiper blade 30 or its equivalent be in one extreme of its movable positions and what is commonly known as a parked position. It is to enable this result to be obtained in connection with the present invention that the contacts 96 and 104 brought out in Fig. 3 are provided. These last mentioned contacts are connected in parallel with the lead 266 (in which the switch 268 is located) between the posts 112 and 114. Accordingly, keeping in mind the description and manner of operation of the contacts 96 and 104 previously given, if the switch 268 is opened at any time except when the contacts 96 and 104 are separated, the flow of current to the mechanism continues until such time as the spring 82 has been moved to that extremity of its movable position in which it engages the arm 102 and separates the contact 104 from the contact element 96, upon which all flow of current to the device is broken and operation immediately ceases. In view of the fact that the spring 82 will be at the described extremity of its movable position only when the windshield wiper blade 30 is at one extremity of its movable position, it will be appreciated that by the mechanism described whenever the switch 268 is opened to stop operation of the mechanism, the mechanism will only stop operating after the windshield wiper blade has reached its limit of movement in the desired direction of travel, or, in other words, has reached its parked position. Accordingly, by the use of the parallel circuit including the contacts 96 and 104 a simple and effective means of parking the wiper each time the mechanism is shut off is provided.

Figure 11:
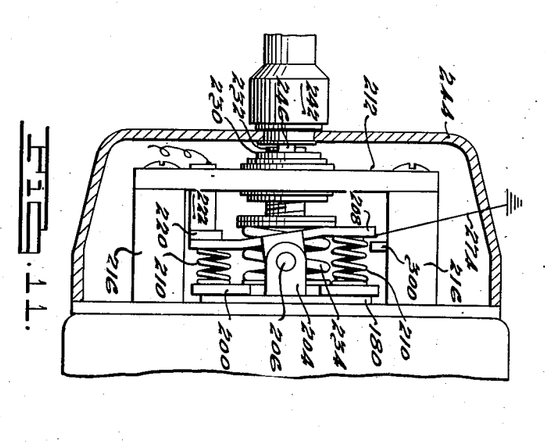
Fig. 11 is a view similar to Fig. 9 but illustrating a modified form of construction for separating the magnetically attractable contacts; and, Fig. 12 is a fragmentary, partially sectioned view taken centrally through a windshield wiper mechanism of the same general type as shown in the previous views but illustrating a modified form of electric drive mechanism.

In Fig. 11 a modified form of means for separating the contact arm 208 from the contact 220 when the armature 180 has moved inwardly a desired distance under the influence of the coil 172 is provided. The only difference in this construction as compared to the previous construction is that instead of employing the arm or part 224 in the previous construction such post is eliminated and in its place a pin 300 is secured to the post 216 opposite the contact 220 and in intersecting relation with respect to the path of movement of the corresponding end of the arm 208. Accordingly, all the remaining parts of the structure are indicated by the same numerals as in the previous construction and inasmuch as all of the parts will operate in the same manner as in the previous construction excepting only as to the method of breaking the circuit between the arm 208 and contact 220, a discussion of the latter only will serve to fully explain the entire construction.

In Fig. 11 the apparatus is illustrated with the armature in its normally inoperative position. Under such circumstances it will be observed that the pin 300 is positioned in the path of movement of one end of the contact arm 208 but is spaced therefrom. As the armature 180 moves under the influence of the coil 172 when energized the magnetic drag between the arms 208 and contact 220 will maintain these last mentioned parts in engagement with each other, causing the arm 208 to pivot about its axis 206 as previously described until the arm 208 contacts the pin 300 whereupon further movement of the armature 180 in the direction described will now cause the pivotal movement of the arms 208 to be reversed, in other words it will now pivot about its point of contact with the pin 300 and cause it to be pulled out of engagement with the contact 220. This reversal of pivotal movement of the arm 208 breaks the circuit to the coil 172 and permits the armature 180 to be returned under the influence of the spring 186 so as to again bring the arm 208 and contact 200 into engagement with each other to initiate another cycle of operation in the same general manner as explained in connection with the previously described construction.

In the broader aspects of the present invention the reciprocating type of electric motor for driving the pumping element may be replaced by a rotating type of electric motor for effecting reciprocation of the piston 156 or its equivalent and such modification is illustrated in Fig. 12. It will be understood that the construction illustrated in Fig. 12 is identical to the construction illustrated in the previous figures from and including the cylinder member 152 to the right thereof as viewed in Fig. 2, the only changes occurring to the left of the cylinder member 152. Consequently a description of the modified portion of the device will serve to amply disclose the construction and operation of the entire device. Referring to Fig. 12 it will be noted that in place of the housing 174 a housing 174' is employed the righthand end of which is sleeved over the members 152 and 124 in identically the same manner as in the previous construction and it is likewise secured to the flange 120 of the housing member 34 in the same manner. The member 160 is replaced by member 160' identical to the member 160 except that it is centrally formed to provide an axially directed collar or sleeve 310 which in this case serves as a guide for the piston rod 182'; the latter being of a shortened character in this construction. The collar 310 is provided with a pair of axially parallel slots 312 which slidably receive the projecting ends of a pin 314 extending diametrically through the rod 182' so as to maintain the rod 182' against rotation in the sleeve 310.

The outer end of the rod 182' is slotted and rotatably received in the slotted portion thereof is a roller 314. Inwardly of the roller 314 the rod 182' has fixed thereto a washer 316 between which and the member 160' adjacent the base of the collar 310 a coil spring 318 surrounding the collar 310 is maintained under compression and, therefore, serves the same purpose as the spring 186 in the previously described construction in moving the piston 156 in a direction opposite to that which it is moved under the influence of the electric motor.

The casing 174' is preferably provided with an internal annular flange 320 adapted to abut the lefthand face of the member 160' whereby to accurately locate the housing axially of the cylinder member 152. To the left of the flange 320 the housing 174' is reduced in diameter and houses therein a conventional rotatable type of electric motor including an armature 322 and field windings 324, the armature being supported on a conventional shaft 326 which has a bearing at its righthand end in a transverse wall 328 formed internally of the housing 174'. Immediately inwardly of the wall 328 the shaft 326 has fixed thereto an axial type of cam 330. The axis of the reduced lefthand portion of the housing 174' is located sufficiently eccentric to the axis of the rod 182' that the roller 314 will engage the peripheral marginal portion of the cam 330. The cam 330 is preferably of the type having a single axial high spot and a single axial low spot in 360 degrees of its angularity and is preferably designed to effect a uniform acceleration of the piston 156 during the first half of its stroke under the influence of the cam 330 and a uniformly decreasing acceleration for the remaining half of the stroke and to permit a like movement of the piston under the influence of the spring 318 during the ensuing stroke. The spring 318 must, of course, be of sufficient strength to maintain the roller 314 in contact with the cam 330 when the cam moves away from the roller during the second stroke of the piston 156.

The same general circuit may be provided for controlling the operation of the construction illustrated in Fig. 12 as in the previously described construction except that a slight modification is desired in order to enable a variation in the speed of the windshield wiper blade to be obtained by varying the volume of fluid being pumped. In other words, the electric motor in Fig. 12 is connected to a battery 340 by means of leads 342 and 344 one of which may include the ground as part thereof if desired. A switch 346 is included in the lead 344 for rendering the construction either operative or inoperative. In the lead 342 a variable resistance 348 is inserted for the purpose of enabling the speed of the electric motor to be varied thereby to vary the discharge volume of the pumping mechanism and by this means vary the speed of operation of the windshield wiper blade in accordance with the same practices as in the previous construction. Leads 350 and 352 bridging the switch 346 extend to the same binding posts 112 and 114 as in the previous construction thereby to provide means whereby operation of the wiper mechanism will be discontinued only when the wiper blade has reached the parked position after the switch 346 has been opened.

From the above it will be appreciated that the modified form of construction illustrated in Fig. 12 may be employed in place of the construction first described and substantially the same results obtained.

As previously mentioned the above described constructions are capable of employing either a gaseous or a liquid medium as a motivating agent for the vane 46. Where liquid is employed it is, of course, essential that the entire fluid circulating system be rendered liquid-tight. In such case the openings 134 and 136 illustrated in Fig. 6 will preferably be eliminated. Where air is employed it will, of course, be obvious that the chamber 48, for instance, may be opened directly to the outside air but this ordinarily will not be advisable for the reason that it is preferable under such circumstances to prevent as much circulation of outside air through the device as is practical in order to prevent possible condensation of moisture in such air interiorly of the mechanism where it might freeze in cold weather and form ice which would prevent operation. With this in mind in the construction shown the chamber 48 is substantially closed to the outside air but is connected through the openings 134 and 136 illustrated in Fig. 6 to the joint between the housing 174 and the flange 120 of the housing member 34. These parts are not sealed in air-tight relation so that any increase or decrease of air volume within the device due to temperature changes may be equalized by slow leakage of air through the joint mentioned and through the passages 136, pocket 124 and passage 134 into the suction side of the device. It will be appreciated that the circulation of outside air into the device under such circumstance will not be sufficient to bring a sufficient amount of water vapor into the device to be condensed therein to offer any serious problem in service.

From the foregoing it will be appreciated that in accordance with the present invention a windshield wiper mechanism is provided that is of a compact unitary type so constructed and arranged as to enable it to be applied to a motor or other vehicle or the like in any one or more of several different locations. The construction depending upon the flow of electrical energy for its continued operation will, of course, operate continuously at a constant speed for which it is adjusted regardless of variations in operation of an internal combustion engine employed to drive the vehicle, thus overcoming the major defects of the so-called vacuum operated windshield wipers now conventionally employed in motor vehicles. Furthermore, employment of a fluid drive between the electrically operated motor and the windshield blade eliminates the necessity of various clutches and other mechanisms required in straight electric windshield wiper mechanisms now found on the market and required to permit shifting of the windshield wiper blade for the purpose of wiping the windshield or the like when the device is inoperative. In other words it eliminates all of the major disadvantages of both the conventional vacuum operated and electrically operated types of windshield wiper mechanism while retaining all of the advantageous features thereof, and at the same time may be embodied in a structure that is relatively economical to produce, that is efficient in operation and of long life.

Having thus described my invention, what I claim by Letters Patent is:

1. In a windshield wiper mechanism or the like, in combination, a first housing comprising a pair of parts cooperating between them to form a vane chamber and a valve chamber, a vane oscillatable in said vane chamber, snap actuated valve mechanism in said valve chamber, a shaft extending into both of said chambers and secured to said vane for oscillation therewith and connected to said snap valve mechanism for actuation thereof, said housing being provided with passages operatively connecting said valve chamber and said vane chamber and controlled by said snap valve mechanism, one of said parts having a substantially flat face arranged in parallelism with the axis of said shaft, a valve plate having a substantially flat face secured in substantial engagement with the first mentioned flat face and having a pair of openings therethrough, a check valve associated with each of said openings and arranged to control the flow of fluid through said plate in opposite directions, one of said check valves arranged to control the discharge of fluid therepast to said valve chamber and the other arranged to control the flow of fluid therepast from said vane chamber, a second plate member secured with a face thereof in flat contacting relationship with the remaining face of said valve plate member and providing a cylinder therein arranged with its axis in substantially perpendicular relationship with respect to the axis of said shaft and exposed to both of said openings, a pumping element mounted for movement in said cylinder, a second housing associated with said last mentioned plate member and arranged with its axis in parallelism with said cylinder, electrical means within said second housing operable upon energization thereof to move said pumping element in one direction, and spring means cooperating with said pumping element to move it in the opposite direction.

2. In a windshield wiper mechanism or the like, in combination, a first housing comprising a pair of parts cooperating between them to form a vane chamber and a valve chamber, a vane oscillatable in said vane chamber, snap actuated valve mechanism in said valve chamber, a shaft extending into both of said chambers and secured to said vane for oscillation therewith and connected to said snap valve mechanism for actuation thereof, said housing being provided with passages operatively connecting said valve chamber and said vane chamber and controlled by said snap valve mechanism, one of said parts having a substantially flat face arranged in parallelism with the axis of said shaft, a valve plate having a substantially flat face secured in substantial engagement with the first mentioned flat face and having a pair of openings therethrough, a check valve associated with each of said openings and arranged to control the flow of fluid through said plate in opposite directions, one of said check valves arranged to control the discharge of fluid therepast to said valve chamber and the other arranged to control the flow of fluid therepast from said vane chamber, a second plate member secured with a face thereof in flat contacting relationship with the remaining face of said valve plate member and providing a cylinder therein arranged with its axis in substantially perpendicular relationship with respect to the axis of said shaft, said openings opening into said cylinder, a piston reciprocable in said cylinder, spring means constantly urging said piston in one direction, a second housing associated with said second plate member and arranged with its axis in parallelism with said cylinder, and electrically energized means in said second housing operable to move said piston in opposition to the force of said spring.

3. In a windshield wiper mechanism or the like, in combination, a first housing comprising a pair of parts cooperating between them to form a vane chamber and a valve chamber, a vane oscillatable in said vane chamber, snap actuated valve mechanism in said valve chamber, a shaft extending into both of said chambers and secured to said vane for oscillation therewith and connected to said snap valve mechanism for actuation thereof, said housing being provided with passages operatively connecting said valve chamber and said vane chamber and controlled by said snap valve mechanism, one of said parts having a substantially flat face arranged in parallelism with the axis of said shaft, a valve plate having a substantially flat face secured in substantial engagement with the first mentioned flat face and having a pair of openings therethrough a check valve associated with each of said openings and arranged to control the flow of fluid through said plate in opposite directions, one of said check valves arranged to control the discharge of fluid therepast to said valve chamber and the other arranged to control the flow of fluid therepast from said vane chamber, a second plate member secured with a face thereof in flat contacting relationship with the remaining face of said valve plate member and providing a cylinder therein arranged with its axis in substantially perpendicular relationship with respect to the axis of said shaft and exposed to both of said openings, a pumping element mounted for movement in said cylinder, spring means constantly urging said pumping element toward one limit of its movement in said cylinder, a second housing associated with said last mentioned plate member and arranged with its axis in parallelism with said cylinder, magnetic means arranged in said second housing in concentric relation with respect thereto, an armature reciprocable in said magnetic means and movable under the force thereof to actuate said pumping element in opposition to said spring means, an electrical circuit for said magnetic means, and make and break mechanism on that side of said magnetic means opposite said piston connected into said circuit and operable to energize said magnetic means when said pumping element is at one limit of its stroke and operable to de-energize said magnetic means when said pumping element is at the opposite end of its stroke.

4. In a windshield wiper mechanism or the like, in combination, a first housing comprising a pair of parts cooperating between them to form a vane chamber and a valve chamber, a vane oscillatable in said vane chamber, snap actuated valve mechanism in said valve chamber, a shaft extending into both of said chambers and secured to said vane for oscillation therewith and connected to said snap valve mechanism for actuation thereof, said housing being provided with passages operatively connecting said valve chamber and said vane chamber and controlled by said snap valve mechanism, one of said parts having a substantially flat face arranged in parallelism with the axis of said shaft, a valve plate having a substantially flat face secured in substantial engagement with the first mentioned flat face and having a pair of openings therethrough, a check valve associated with each of said openings and arranged to control the flow of fluid through said plate in opposite directions, one of said check valves arranged to control the discharge of fluid therepast to said valve chamber and the other arranged to control the flow of fluid therepast from said vane chamber, a second plate member secured with a face thereof in flat contacting relationship with the remaining face of said valve plate member and providing a cylinder therein arranged with its axis in substantially perpendicular relationship with respect to the axis of said shaft and exposed to both of said openings, a pumping element mounted for movement in said cylinder, a second housing associated with said last mentioned plate member and arranged with its axis in parallelism with said cylinder, a rotatable electric motor in said housing, an axial cam on said motor cooperating with said pumping element to move it in one direction, and spring means constantly urging said pumping element in the opposite direction.

FRANK E. TWISS.